US012781867B2

(12) United States Patent
Chen et al.

(10) Patent No.: US 12,781,867 B2
(45) Date of Patent: Nov. 3, 2026

(54) STOP VALVE, MACHINING METHOD AND ASSEMBLY METHOD

(71) Applicant: ZHEJIANG DUNAN ARTIFICIAL ENVIRONMENT CO., LTD., Shaoxing (CN)

(72) Inventors: Diyong Chen, Shaoxing (CN); Jie Shou, Shaoxing (CN); Guanghua Feng, Shaoxing (CN); Weineng Chen, Shaoxing (CN); Bin Luo, Shaoxing (CN); Feng Lou, Shaoxing (CN); Xingyang Yuan, Shaoxing (CN)

(73) Assignee: ZHEJIANG DUNAN ARTIFICIAL ENVIRONMENT CO., LTD., Shaoxing (CN)

( * ) Notice: Subject to any disclaimer, the term of this patent is extended or adjusted under 35 U.S.C. 154(b) by 0 days.

(21) Appl. No.: 18/710,096

(22) PCT Filed: Oct. 25, 2022

(86) PCT No.: PCT/CN2022/127405
§ 371 (c)(1),
(2) Date: May 14, 2024

(87) PCT Pub. No.: WO2023/093424
PCT Pub. Date: Jun. 1, 2023

(65) Prior Publication Data

US 2025/0020219 A1 Jan. 16, 2025

(30) Foreign Application Priority Data

Nov. 23, 2021 (CN) ......................... 202111398144.3
Nov. 23, 2021 (CN) ......................... 202111398222.X
(Continued)

(51) Int. Cl.
*F16K 27/10* (2006.01)
*F16K 27/02* (2006.01)

(52) U.S. Cl.
CPC ............ *F16K 27/102* (2013.01); *F16K 27/02* (2013.01)

(58) Field of Classification Search
CPC .......... F16K 1/04; F16K 27/102; F16K 35/06; F16K 1/08; F16K 3/246; F16K 11/04;
(Continued)

(56) References Cited

U.S. PATENT DOCUMENTS 1,465,540 A * 8/1923 Brandriff ................ F16K 11/04 122/DIG. 15
1,640,527 A * 8/1927 Brown ...................... F16K 1/42 137/454.6
(Continued)

FOREIGN PATENT DOCUMENTS

CN 101016960 A 8/2007
CN 201428808 Y 3/2010
(Continued)

OTHER PUBLICATIONS

Machine English translation of EP_0217321_A2 (Year: 2025).*
(Continued)

*Primary Examiner* — Hailey K. Do
(74) *Attorney, Agent, or Firm* — The Sun IP Law

(57) ABSTRACT

A stop valve, including: a valve tube, wherein two ends thereof are respectively an operating end and a plugging end, a side wall of the valve tube is provided with a first interface and a second interface, the second interface is close to the plugging end relative to the first interface, and a space between the second interface and the plugging end in the valve tube forms a buffer chamber; a base, used for plugging an opening of the plugging end; a sleeve ring, fixed in the
(Continued)

cavity of the valve tube, the sleeve ring is provided with a valve port; and a valve core, disposed in the cavity of the valve tube, so as to close or open the valve port; and the valve tube and the base both are made of stainless steel.

9 Claims, 13 Drawing Sheets

(30) Foreign Application Priority Data

Nov. 23, 2021 (CN) ......................... 202122903993.1
Nov. 23, 2021 (CN) ......................... 202122941454.7

(58) Field of Classification Search
CPC ...... F16K 11/07; F16K 27/02; F16K 27/0263; F16K 27/041; F16K 27/105; Y10T 137/0502; Y10T 137/0519; B23P 15/001; F16L 29/002; F16L 55/07; F16L 41/021
See application file for complete search history.

(56) References Cited

U.S. PATENT DOCUMENTS

| | | | | | |
|---|---|---|---|---|---|
| 1,935,329 | A | * | 11/1933 | Needham | F16K 27/102 251/366 |
| 2,784,933 | A | * | 3/1957 | Newell et al. | F16K 1/04 169/37 |
| 5,908,044 | A | * | 6/1999 | Kearns | F16J 15/168 137/15.16 |
| 6,269,840 | B1 | * | 8/2001 | Beaver | F16K 1/04 137/637.4 |
| 11,931,864 | B2 | * | 3/2024 | Shafferkoetter | B24C 7/0053 |
| 2015/0136257 | A1 | * | 5/2015 | Shih | F16K 11/207 137/603 |

FOREIGN PATENT DOCUMENTS

| | | | | | |
|---|---|---|---|---|---|
| CN | 203115154 | U | | 8/2013 | |
| CN | 104180064 | A | | 12/2014 | |
| CN | 110206907 | A | * | 9/2019 | F16L 41/021 |
| CN | 111102366 | A | | 5/2020 | |
| CN | 211501648 | U | | 9/2020 | |
| CN | 211501693 | U | | 9/2020 | |
| CN | 211875111 | U | | 11/2020 | |
| CN | 112045375 | A | | 12/2020 | |
| CN | 112066015 | A | | 12/2020 | |
| CN | 212455512 | U | | 2/2021 | |
| CN | 113007413 | A | | 6/2021 | |
| CN | 113566460 | A | | 10/2021 | |
| CN | 216742841 | U | | 6/2022 | |
| CN | 216742842 | U | | 6/2022 | |
| CN | 216742843 | U | | 6/2022 | |
| DE | 19527760 | A1 | | 1/1997 | |
| EP | 0217321 | A2 | | 4/1987 | |
| FR | 1014834 | A | | 8/1952 | |
| JP | S5091032 | A | | 7/1975 | |
| JP | S5892552 | U | | 6/1983 | |
| JP | S6049254 | U | | 4/1985 | |
| JP | H9229218 | A | | 9/1997 | |
| JP | 2003065458 | A | | 3/2003 | |
| KR | 20060129998 | A | * | 12/2006 | F16K 1/04 |
| KR | 20150001265 | U | * | 3/2015 | F16K 1/08 |

OTHER PUBLICATIONS

Machine English translation of KR_20060129998_A (Year: 2025).*
Machine English translation of CN_110206907_A (Year: 2026).*
Machine English translation of KR_20150001265_U (Year: 2026).*
The first office action of counterpart EP application No. 22897507 issued on Jan. 7, 2025.
The search report of JP application No. 2024522624 issued on Jun. 12, 2025.
The first office action of counterpart CN application No. 202111398144.3 issued on Aug. 18, 2025.
The first office action of counterpart CN application No. 202111398222.X issued on Dec. 3, 2025.

* cited by examiner

STOP VALVE, MACHINING METHOD AND ASSEMBLY METHOD

CROSS-REFERENCE TO RELATED APPLICATIONS

The present disclosure is a national stage application of International Patent Application No. PCT/CN2022/127405, which is filed on Oct. 25, 2022.

The present disclosure is based upon and claims priority to patent application No. 202111398144.3, filed to the China National Intellectual Property Administration on Nov. 23, 2021, and entitled “Stop Valve, Machining Method and Assembly Method”, the disclosure of which is hereby incorporated by reference in its entirety.

The present disclosure is based upon and claims priority to patent application No. 202122941454.7, filed to the China National Intellectual Property Administration on Nov. 23, 2021, and entitled “Stop Valve”, the disclosure of which is hereby incorporated by reference in its entirety.

The present disclosure is based upon and claims priority to patent application No. 202111398222.X, filed to the China National Intellectual Property Administration on Nov. 23, 2021, and entitled “Stop Valve, Machining Method and Assembly Method”, the disclosure of which is hereby incorporated by reference in its entirety.

The present disclosure is based upon and claims priority to patent application No. 202122903993.1, filed to the China National Intellectual Property Administration on Nov. 23, 2021, and entitled “Stop Valve”, the disclosure of which is hereby incorporated by reference in its entirety.

TECHNICAL FIELD

The present disclosure relates to the technical field of stop valves, and in particular to a stop valve, a machining method and an assembly method.

BACKGROUND

At present, an existing stop valve is usually composed of a valve body, a valve core and other structures, and a valve port is opened or closed by an up-and-down movement of the valve core in the valve body. In the prior art, when the valve port is opened, a fluid enters the valve body, a kinetic energy is relatively large, resulting in unstable flow of the fluid; as an overall structure of the valve body is complex, it is often difficult to implement actual machining of the valve body and overall assembly of the stop valve, thereby resulting in an increase in the machining cost; and moreover, the valve body and the valve core are usually made of brass, and the cost of a brass material is relatively high.

SUMMARY

The present disclosure provides a stop valve, a machining method and an assembly method, so as to solve problems of unstable flow of a fluid, machining difficulty and high cost of a stop valve in the prior art.

In order to solve the above problems, according to one aspect of the present disclosure, the present disclosure provides a stop valve, including: a valve tube, wherein two ends of the valve tube are respectively an operating end and a plugging end, a side wall of the valve tube is provided with a first interface and a second interface, the first interface and the second interface both communicate with a cavity of the valve tube, the second interface is close to the plugging end relative to the first interface, and a space between the second interface and the plugging end in the valve tube forms a buffer chamber; a base, which is used for plugging an opening of the plugging end; a sleeve ring, which is fixed in the cavity of the valve tube, wherein an outer wall of the sleeve ring is in sealing fit with an inner wall of the valve tube, the sleeve ring is located between the first interface and the second interface, and the sleeve ring is provided with a valve port; and a valve core, which is movably disposed in the cavity of the valve tube, so as to close or open the valve port, wherein the valve core is located on a side of the sleeve ring facing the operating end; and the valve tube and the base both are made of stainless steel.

In some embodiments, an outer wall of the valve core is provided with external threads, the valve core is internally provided with an operation portion, the operation portion is disposed on an end away from the valve port, the stop valve further includes a pressing block, disposed in the cavity of the valve tube, an outer wall of the pressing block is fixedly connected with the inner wall of the valve tube, the pressing block is provided with internal threads, and the internal threads match the external threads.

In some embodiments, the sleeve ring is made of stainless steel, and/or the valve core is made of stainless steel, and/or the pressing block is made of stainless steel.

In some embodiments, a side of the pressing block that faces the valve port is provided with an annular groove, the stop valve further includes a first sealing gasket, the first sealing gasket is sleeved on the valve core, and the first sealing gasket is in stop fit with a periphery of the annular groove.

In some embodiments, a side wall of the valve core is provided with a first annular groove and a second annular groove, the stop valve further includes a sealing member and a second sealing gasket, the sealing member is located in the first annular groove, the sealing member is in sealing fit with the inner wall of the valve tube, and the second sealing gasket is located in the second annular groove; and when the valve port is closed, the second sealing gasket abuts against a periphery of the valve port.

In some embodiments, the valve core includes a first rod segment, a second rod segment and a third rod segment, which are connected in sequence, a diameter of the second rod segment is greater than a diameter of the first rod segment and a diameter of the third rod segment, the diameter of the third rod segment is less than a diameter of the valve port, and two ends of the second rod segment are respectively provided with the first annular groove and the second annular groove, an opening of the first annular groove faces the inner wall of the valve tube, and an opening of the second annular groove faces the sleeve ring.

In some embodiments, the sleeve ring includes a sleeve body and an annular convex rib disposed on an end of the sleeve body, an outer wall of the sleeve body is connected with the inner wall of the valve tube, an outer diameter of the annular convex rib is less than an outer diameter of the sleeve body, and an opening of the annular convex rib forms the valve port; and when the valve port is closed, the second sealing gasket abuts against the annular convex rib.

In some embodiments, the stop valve further includes: a first connecting pipe, wherein a first end of the first connecting pipe is connected with the first interface, and the first connecting pipe is made of stainless steel; and a second connecting pipe, wherein a first end of the second connecting pipe is connected with the second interface, the second connecting pipe and the first connecting pipe are disposed in parallel, and the second connecting pipe is made of stainless steel.

In some embodiments, the stop valve further includes: a third connecting pipe, which is sleeved on a second end of the first connecting pipe that is away from the first interface; and a fourth connecting pipe, which is sleeved on a second end of the second connecting pipe that is away from the second interface.

In some embodiments, the stop valve further includes a first valve cover, a second valve cover and a third valve cover, the first valve cover covers the operating end of the valve tube, the second valve cover covers an end of the third connecting pipe, and the third valve cover covers an end of the fourth connecting pipe.

In some embodiments, the side wall of the valve tube is further provided with an air vent, the air vent communicates with the cavity of the valve tube, the stop valve further includes an air valve structure, and the air valve structure is connected with the air vent.

According to another aspect of the present disclosure, provided is a machining method for machining the above-mentioned stop valve. The machining method includes: machining a plurality of flanging ports on a side wall of a stainless steel pipe by using a flanging machine, so as to machine the valve tube of the stop valve; performing cold upsetting and cutting machining on a stainless steel bar or the stainless steel pipe, so as to machine the sleeve ring of the stop valve; performing cold upsetting and cutting machining on the stainless steel bar, so as to machine the valve core of the stop valve; performing cutting machining on the stainless steel bar, so as to machine the pressing block of the stop valve; and performing stamping on a stainless steel plate, so as to machine the base of the stop valve.

According to another aspect of the present disclosure, provided is an assembly method for assembling the above-mentioned stop valve. The assembly method includes: S1, pressing the sleeve ring of the stop valve into the valve tube of the stop valve, correspondingly pressing a first connecting pipe, a second connecting pipe and an inflating valve of the stop valve into the first interface, the second interface and the air vent of the valve tube, and connecting the base of the stop valve with the valve tube by spot welding; S2, performing furnace brazing on an overall structure assembled in S1; S3, sleeving a first sealing gasket, a second sealing gasket and a sealing member of the stop valve on the valve core of the stop valve; S4, integrally loading a structure assembled in S3 into the valve tube; and S5, pressing the pressing block of the stop valve into the valve tube, and then connecting the pressing block and the valve tube by laser welding or argon arc welding.

By applying technical solutions of the present disclosure, provided is a stop valve, including: a valve tube, wherein two ends of the valve tube are respectively an operating end and a plugging end, a side wall of the valve tube is provided with a first interface and a second interface, the first interface and the second interface both communicate with a cavity of the valve tube, the second interface is close to the plugging end relative to the first interface, and a space between the second interface and the plugging end in the valve tube forms a buffer chamber; a base, which is used for plugging an opening of the plugging end; a sleeve ring, which is fixed in the cavity of the valve tube, wherein an outer wall of the sleeve ring is in sealing fit with an inner wall of the valve tube, the sleeve ring is located between the first interface and the second interface, and the sleeve ring is provided with a valve port; and a valve core, which is movably disposed in the cavity of the valve tube, so as to close or open the valve port, wherein the valve core is located on a side of the sleeve ring facing the operating end; and the valve tube and the base both are made of stainless steel. By using the solution, since the buffer chamber is disposed in the space between the second interface and the plugging end, when the valve port is opened, a fluid enters the buffer chamber after flowing into the valve tube, so that the kinetic energy of the fluid is able to be alleviated, thereby playing a role of buffering and enabling the fluid to flow more stably; and by connecting the base and the valve tube, the machining and overall assembly of the stop valve are easier, brazing may be used in a connection mode to ensure that the connection is more stable and reliable; and the valve tube and the base are made of stainless steel, thereby reducing the production costs. In the present solution, by an up-and-down movement of the valve core in the cavity of the valve body, the first interface and the second interface may be connected or disconnected, that is, the valve port is opened or closed; and the sleeve ring is connected with the cavity of the valve tube, thereby reducing the machining difficulty, the brazing may be used in the connection mode to ensure that the connection is more stable and reliable, and the outer wall of the sleeve ring may be in sealing fit with the inner wall of the valve tube, thereby improving the sealing performance at the valve port.

BRIEF DESCRIPTION OF THE DRAWINGS

The drawings, which constitute a part of the present disclosure, are used to provide a further understanding of the present disclosure, and the schematic embodiments of the present disclosure and the description thereof are used to explain the present disclosure, and do not constitute an improper limitation on the present disclosure. In the drawings.

Figure 1:
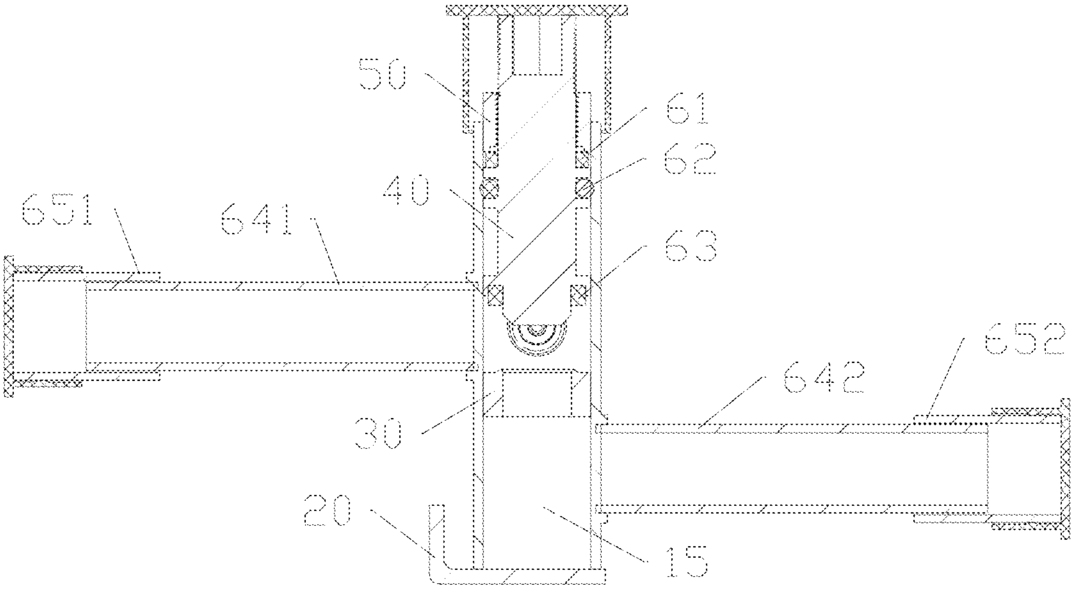
FIG. 1 illustrates a section view when a stop valve provided in Embodiment 1 of the present disclosure is opened.
Figure 2:
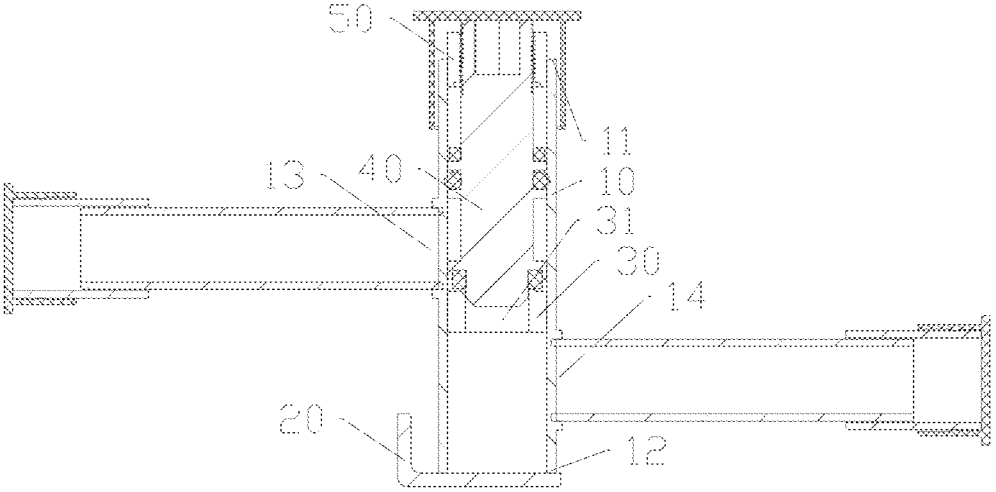
FIG. 2 illustrates a section view when the stop valve in FIG. 1 is closed.

The drawings include the following reference signs:

10. valve tube; 11. operating end; 12. plugging end; 13. first interface; 14. second interface; 15. buffer chamber; 16. air vent;

20. base; 21. guide tube; 211. avoidance port; 212. tube body; 213. annular convex ring; 22. mounting base; 23. accommodating chamber;

30. sleeve ring; 31. valve port; 32. sleeve body; 33. annular convex rib;

40. valve core; 41. external thread; 42. operation portion; 43. first annular groove; 44. second annular groove; 45. first rod segment; 46. second rod segment; 47. third rod segment;

50. pressing block; 51. internal thread; 52. annular groove;

61. first sealing gasket; 62. sealing member; 63. second sealing gasket; 641. first connecting pipe; 642. second connecting pipe; 651. third connecting pipe; 652. fourth connecting pipe; 661. first valve cover; 662. second valve cover; 663. third valve cover; 67. air valve structure.

DETAILED DESCRIPTION OF THE EMBODIMENTS

A clear and complete description of technical solutions in the embodiments of the present disclosure will be given below, in combination with the drawings in the embodiments of the present disclosure. Apparently, the embodiments described below are merely a part, but not all, of the embodiments of the present disclosure. The following description of at least one exemplary embodiment is merely illustrative in nature and is in no way intended to limit the present disclosure and its disclosure or usage. All of other embodiments, obtained by those ordinary skilled in the art based on the embodiments in the present disclosure without any creative effort, fall into the protection scope of the present disclosure.

As shown in FIG. 1 to FIG. 7, Embodiment 1 of the present disclosure provides a stop valve, including: a valve tube 10, wherein two ends of the valve tube 10 are respectively an operating end 11 and a plugging end 12, a side wall of the valve tube 10 is provided with a first interface 13 and a second interface 14, the first interface 13 and the second interface 14 both communicate with a cavity of the valve tube 10, the second interface 14 is close to the plugging end 12 relative to the first interface 13, and a space between the second interface 14 and the plugging end 12 in the valve tube 10 forms a buffer chamber 15; a base 20, which is connected with the plugging end 12, so as to plug an opening of the plugging end 12; a sleeve ring 30, which is fixed in the cavity of the valve tube 10, wherein an outer wall of the sleeve ring 30 is in sealing fit with an inner wall of the valve tube 10, the sleeve ring 30 is located between the first interface 13 and the second interface 14, and the sleeve ring 30 is provided with a valve port 31; and a valve core 40, which is movably disposed in the cavity of the valve tube 10, so as to close or open the valve port 31, wherein the valve core 40 is located on a side of the sleeve ring 30 that faces the operating end 11; and the valve tube 10 and the base 20 both are made of stainless steel.

By using the solution, since the buffer chamber 15 is disposed in the space between the second interface 14 and the plugging end 12, when the valve port 31 is opened, a fluid flows into the second interface 14 and enters the buffer chamber 15, so that the kinetic energy of the fluid is able to be alleviated, thereby playing a role of buffering and enabling the fluid to flow more stably; and by connecting the base 20 and the valve tube 10, the machining and overall assembly of the stop valve are easier, brazing may be used in a connection mode to ensure that the connection is more stable and reliable; and the valve tube 10 and the base 20 are made of stainless steel, thereby reducing the production costs. In the present solution, by an up-and-down movement of the valve core 40 in the cavity of the valve tube 10, the first interface 13 and the second interface 14 may be connected or disconnected, that is, the valve port 31 is opened or closed; and the sleeve ring 30 is connected with the cavity of the valve tube 10, thereby reducing the machining difficulty, brazing may be used in the connection mode to ensure that the connection is more stable and reliable, and the outer wall of the sleeve ring 30 may be in sealing fit with the inner wall of the valve tube 10, thereby improving the sealing performance at the valve port 31.

In some embodiments, the first interface 13 and the second interface 14 on the side wall of the valve tube 10 may be machined in a flanging manner, so that the machining is easier.

An outer wall of the valve core 40 is provided with external threads 41, the valve core 40 is internally provided with an operation portion 42, an opening of the operation portion 42 faces away from the valve port 31, the stop valve further includes a pressing block 50, disposed in the cavity of the valve tube 10, an outer wall of the pressing block 50 is fixedly connected with the inner wall of the valve tube 10, the pressing block 50 is provided with internal threads 51, and the internal threads 51 match the external threads 41. In this way, the valve core 40 may move up and down in the cavity of the valve tube 10, so as to open or close the valve port 31. In some embodiments, the operation portion 42 is of a hexagonal structure or a quadrilateral structure, thereby facilitating an operation of a user.

In the present embodiment, the sleeve ring 30 is made of stainless steel, and/or the valve core 40 is made of stainless steel, and/or the pressing block 50 is made of stainless steel. The sleeve ring 30, the valve core 40 and the pressing block 50 are all made of stainless steel, thereby reducing the production costs.

In some embodiments, a side of the pressing block 50 that faces the valve port 31 is provided with an annular groove 52, the stop valve further includes a first sealing gasket 61, the first sealing gasket 61 is sleeved on the valve core 40, and the first sealing gasket 61 is in stop fit with a periphery of the annular groove 52. By providing the annular groove 52 in the pressing block 50, a part of the first sealing gasket 61 may be embedded into the annular groove 52, when the valve port 31 is opened, an end of the valve core 40 moves towards the annular groove 52, and the periphery of the annular groove 52 may limit the first sealing gasket 61, so as to prevent the valve core 40 from coming out; and moreover, since the valve core 40 is in sealing fit with the valve tube 10, a leakage of the fluid may be prevented.

In some embodiments, a side wall of the valve core 40 is provided with a first annular groove 43 and a second annular groove 44, the stop valve further includes a sealing member 62 and a second sealing gasket 63, the sealing member 62 is located in the first annular groove 43, the sealing member 62 is in sealing fit with the inner wall of the valve tube 10, and the second sealing gasket 63 is located in the second annular groove 44; and when the valve port 31 is closed, the second sealing gasket 63 abuts against a periphery of the valve port 31.

In the present solution, the sealing member 62 abuts against an inner wall of the first annular groove 43, and the sealing member 62 is in sealing fit with the inner wall of the valve tube 10, thereby improving a sealing performance of the valve core 40 and the valve tube 10; and the second sealing gasket 63 abuts against an inner wall of the second annular groove 44, thereby improving the sealing performance of the valve core 40 and the valve tube 10. The second annular groove 44 may be understood as an annular step. When the valve port 31 is closed, the second sealing gasket 63 may abut against the periphery of the valve port 31, thereby realizing a soft sealing between the valve core 40 and the valve port 31, and effectively reducing a working intensity of the user. In the present embodiment, the sealing member is a sealing ring. The sealing member may also be a combined sealing member.

The valve core 40 includes a first rod segment 45, a second rod segment 46 and a third rod segment 47, which are connected in sequence, a diameter of the second rod segment 46 is greater than a diameter of the first rod segment 45 and a diameter of the third rod segment 47, the diameter of the third rod segment 47 is less than a diameter of the valve port 31, and two ends of the second rod segment 46 are respectively provided with the first annular groove 43 and the second annular groove 44, wherein an opening of the first annular groove 43 faces the inner wall of the valve tube 10, and an opening of the second annular groove 44 faces the sleeve ring 30. In this way, the diameter of the third rod segment 47 is set to be less than the diameter of the valve port 31, thereby facilitating a cooperation with the valve port 31; and the diameter of the second rod segment 46 is set to be greater than the diameter of the first rod segment 45 and the diameter of the third rod segment 47, therefore when the valve port 31 is closed, the sleeve ring 30 may stop the valve core 40, thereby defining a movement range of the valve core 40. In the present solution, the diameter of the opening of the second annular groove 44 is less than an inner diameter of the second annular groove 44, so that the second sealing gasket 63 is able to be better embedded, and the sealing performance of the valve port 31 is improved.

Figure 3:
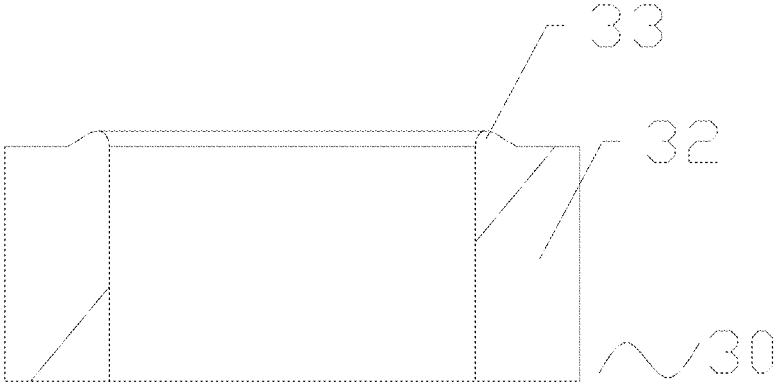
FIG. 3 illustrates a section view of a sleeve ring in FIG. 1.
Figure 4:
FIG. 4 illustrates a section view of a pressing block in FIG. 1.

As shown in FIG. 3, the sleeve ring 30 includes a sleeve body 32 and an annular convex rib 33 disposed on an end of the sleeve body 32, an outer wall of the sleeve body 32 is connected with the inner wall of the valve tube 10, an outer diameter of the annular convex rib 33 is less than an outer diameter of the sleeve body 32, and the opening of the annular convex rib 33 forms the valve port 31; and when the valve port 31 is closed, the second sealing gasket 63 abuts against the annular convex rib 33. By disposing the annular convex rib 33, a sealing effect of the valve port 31 is able to be better improved. When the valve port 31 is closed, the annular convex rib 33 may abut against the second sealing gasket 63, thereby realizing the soft sealing between the valve core 40 and the valve port 31.

Figure 5:
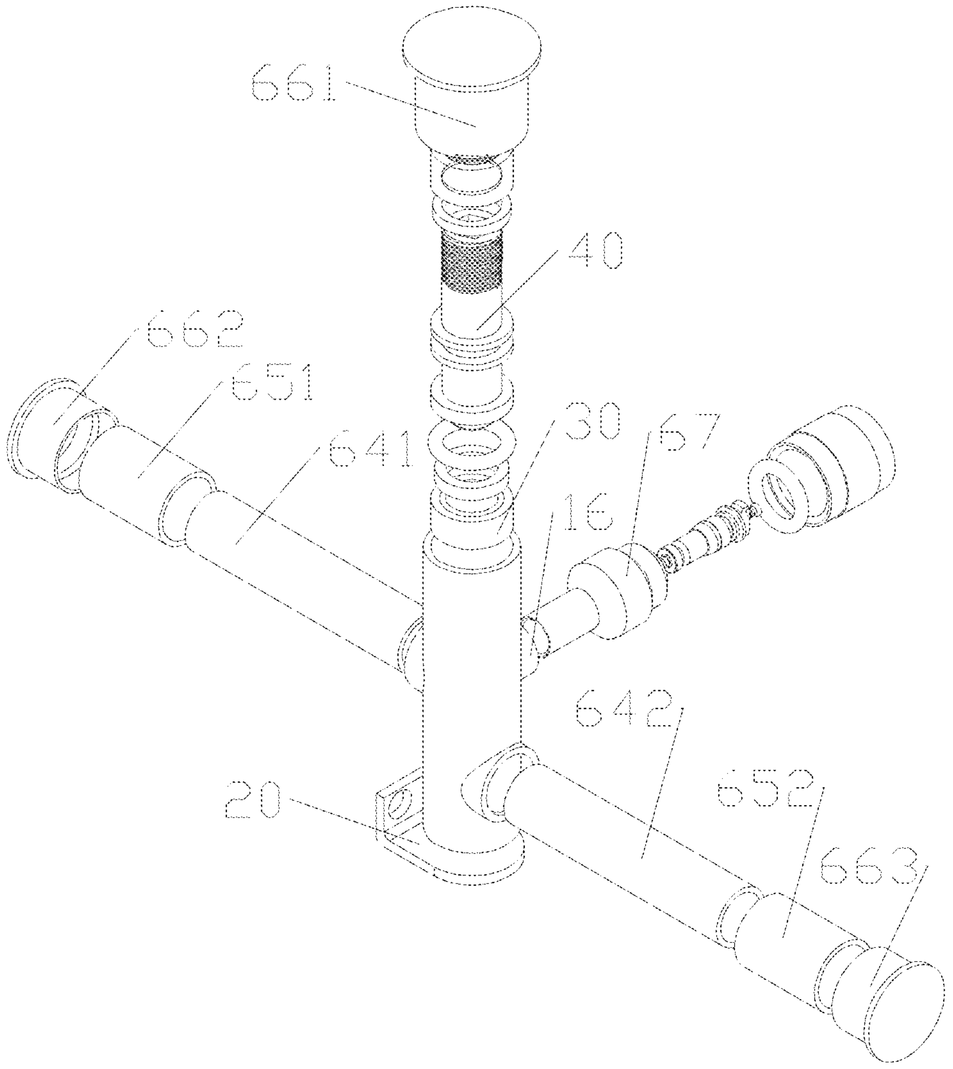
FIG. 5 illustrates an exploded view of the stop valve in FIG. 1.
Figure 6:
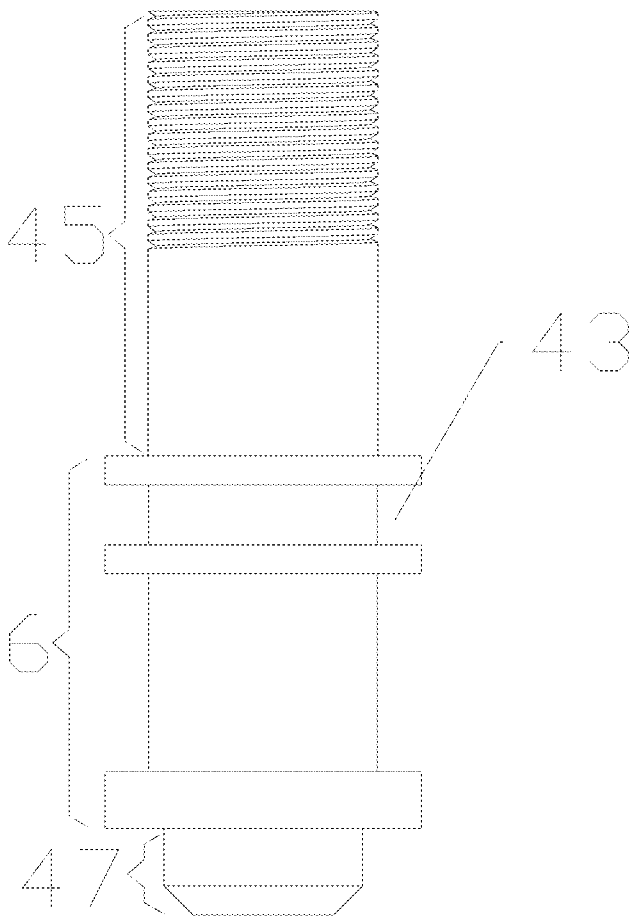
FIG. 6 illustrates a structural diagram of a valve core in FIG. 1.
Figure 7:
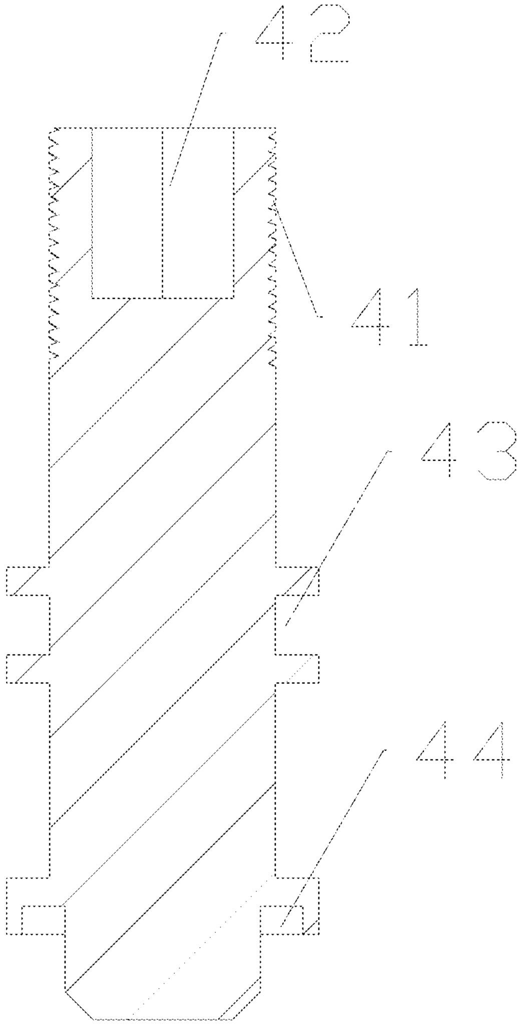
FIG. 7 illustrates a section view of a valve core in FIG. 6.
Figure 8:
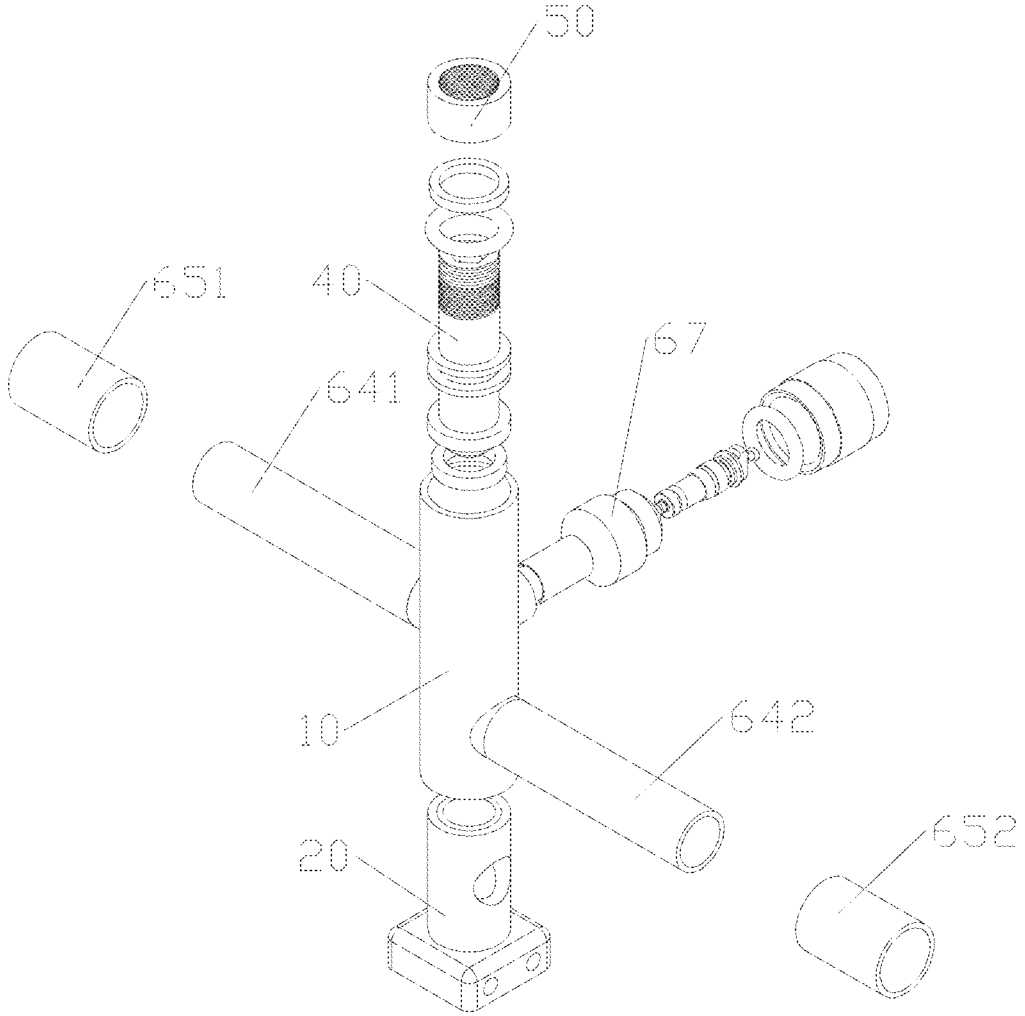
FIG. 8 illustrates an exploded view of a stop valve provided in Embodiment 2 of the present disclosure.

As shown in FIG. 5, the stop valve further includes: a first connecting pipe 641, wherein a first end of the first connecting pipe 641 is connected with the first interface 13, and the first connecting pipe 641 is made of stainless steel; and a second connecting pipe 642, wherein a first end of the second connecting pipe 642 is connected with the second interface 14, the second connecting pipe 642 and the first connecting pipe 641 are disposed in parallel, and the second connecting pipe 642 is made of stainless steel. In this way, communication with an external connecting pipe is facilitated; the first connecting pipe 641 and the second connecting pipe 642 are respectively connected with the first interface 13 and the second interface 14, and brazing may be used in the connection mode, thereby being stable and firm; and since the first connecting pipe 641 and the second connecting pipe 642 are respectively connected with the first interface 13 and the second interface 14, a circulation of the fluid may be realized. The first connecting pipe 641 and the second connecting pipe 642 are made of stainless steel, thereby reducing the material costs.

The stop valve further includes: a third connecting pipe 651, which is sleeved on a second end of the first connecting pipe 641 that is away from the first interface 13; and a fourth connecting pipe 652, which is sleeved on a second end of the second connecting pipe 642 that is away from the second interface 14. The third connecting pipe 651 and the fourth connecting pipe 652 are respectively sleeved on the second end of the first connecting pipe 641 and the second end of the second connecting pipe 642, thereby facilitating the connection with the external connecting pipe, and improving a convenience of the stop valve. The third connecting pipe 651 and the fourth connecting pipe 652 are made of red copper, so that the user is able to connect the external connecting pipe more conveniently.

In some embodiments, the stop valve further includes a first valve cover 661, a second valve cover 662 and a third valve cover 663, the first valve cover 661 covers the operating end 11 of the valve tube 10, the second valve cover 662 covers an end of the third connecting pipe 651, and the third valve cover 663 covers an end of the fourth connecting pipe 652. By disposing the first valve cover 661, the operating end of the valve tube 10 is able to be covered, thereby preventing the valve tube 10 from being interfered by an outside, and thus ensuring the safety and stability at work; and the second valve cover 662 and the third valve cover 663 are respectively used for covering the end of the third connecting pipe 651 and the end of the fourth connecting pipe 652, so as to prevent inner cavities of the third connecting pipe 651 and the fourth connecting pipe 652 from being interfered by the outside. The first valve cover 661, the second valve cover 662 and the third valve cover 663 may be made of stainless steel or a plastic material, thereby reducing the material costs.

In some embodiments, the side wall of the valve tube 10 is further provided with an air vent 16, the air vent 16 communicates with the cavity of the valve tube 10, the stop valve further includes an air valve structure 67, and the air valve structure 67 is connected with the air vent 16. By configuring the air valve structure 67 to communicate with the cavity of the valve tube 10, inflation and deflation are able to be performed if necessary, and the sealing performance of an air pressure in the stop valve is able to be maintained, thereby ensuring the stability at work. The air valve structure 67 may be made of stainless steel, thereby reducing the material costs.

The air valve structure 67 includes a tube body, an air valve core and a tube cap, a first end of the tube body is connected with the air vent 16, the air valve core is disposed in the tube body, and the tube cap is used for covering a second end of the tube body. The first end of the tube body is connected with the air vent 16, and brazing may be used in the connection mode, thereby being stable and reliable.

In some embodiments, the base 20 includes a bottom plate and a folded plate, which are perpendicular to each other, the bottom plate is welded with the plugging end 12 of the valve tube 10, and the folded plate is provided with a through hole. The bottom plate is welded with the plugging end 12 of the valve tube 10, thereby being stable and reliable; and by disposing the through hole, the installation with an external structure is facilitated.

Another embodiment of the present disclosure provides a machining method for machining the above-mentioned stop valve. The machining method includes: machining a plurality of flanging ports on a side wall of a stainless steel pipe by using a flanging machine, so as to machine the valve tube 10 of the stop valve; performing cold upsetting and cutting machining on a stainless steel bar or the stainless steel pipe, so as to machine the sleeve ring 30 of the stop valve; performing cold upsetting and cutting machining on the stainless steel bar, so as to machine the valve core 40 of the stop valve; performing cutting machining on the stainless steel bar, so as to machine the pressing block 50 of the stop valve; and performing stamping on a stainless steel plate, so as to machine the base 20 of the stop valve.

By using the above-mentioned machining method, part machining is able to be performed by using existing stainless steel pipes, stainless steel bars and stainless steel plates, thereby reducing the machining difficulty and the material costs. Flanging machining is performed on the stainless steel pipe by using the flanging machine, so that the valve tube 10 of the stop valve is able to be machined; both the sleeve ring 30 and the valve core 40 may be obtained by performing cold upsetting and cutting machining on the stainless steel bar; the pressing block 50 may be obtained by performing cutting machining on the stainless steel bar; and the base 20 is obtained by performing stamping on the stainless steel plate. The plurality of flanging ports include the first interface 13, the second interface 14 and the air vent 16.

Moreover, the machining method further includes: performing cutting machining on the stainless steel pipe, so as to obtain the first connecting pipe 641 and the second connecting pipe 642; and performing cutting machining on a red copper pipe, so as to obtain the third connecting pipe 651 and the fourth connecting pipe 652; and performing cutting machining on the stainless steel bar, so as to obtain the air valve structure 67.

Another embodiment of the present disclosure provides an assembly method for assembling the above-mentioned stop valve. The assembly method includes: S1, pressing the sleeve ring 30 of the stop valve into the valve tube 10 of the stop valve, correspondingly pressing the first connecting pipe 641, the second connecting pipe 642 and an inflating valve of the stop valve into the first interface 13, the second interface 14 and the air vent 16 of the valve tube 10, and connecting the base 20 of the stop valve with the valve tube 10 by means of spot welding; S2, performing furnace brazing on an overall structure assembled in S1; S3, sleeving the first sealing gasket 61, the second sealing gasket 63 and the sealing member 62 of the stop valve on the valve core 40 of the stop valve; S4, integrally loading a structure assembled in S3 into the valve tube 10; and S5, pressing the pressing block 50 of the stop valve into the valve tube 10, and then connecting the pressing block 50 and the valve tube 10 by laser welding or argon arc welding.

By using the above assembly method, the sleeve ring 30, the first connecting tube 641, the second connecting tube 642 and the air valve structure 67 are pressed into corresponding positions respectively, the base 20 is connected with the valve tube 10 by spot welding, and furnace brazing may be performed on an assembled overall structure, such that the assembly is more convenient, and the connection is firm, wherein a welding environment temperature is 1020° C. to 1040° C.; then, the first sealing gasket 61, the second sealing gasket 63 and the sealing member 62 are sleeved on the valve core 40 of the stop valve and are installed in the valve tube 10; the pressing block 50 is pressed into the valve tube 10, and the pressing block 50 is connected with the valve tube 10 by laser welding or argon arc welding, so that the connection is more stable and firm. The assembly method further includes: performing a water inspection sealing test on an assembled stop valve, so as to ensure the sealing performance of the stop valve; and drying the stop valve, and finally mounting the first valve cover 661, the second valve cover 662 and the third valve cover 663, so as to ensure that the stop valve avoids external interference.

As shown in FIG. 8 to FIG. 15, Embodiment 2 of the present disclosure provides a stop valve, the base 20 is of an integrated structure, the base 20 includes a guide tube 21 and a mounting base 22, which are connected with each other, the guide tube 21 penetrates into the cavity of the valve tube 10, the mounting base 22 plugs the opening of the plugging end 12, a side wall of the guide tube 21 is provided with an avoidance port 211, the avoidance port 211 communicates with the second interface 14, an opening at an end portion of the guide tube 21 forms the valve port 31, and the valve port 31 is located between the first interface 13 and the second interface 14.

In the present solution, by disposing the valve tube 10 and the base 20, the valve body is set to be a split structure, and the valve tube 10 and the base 20 are respectively machined and then are connected to form an integral structure of the valve body, so that the machining difficulty of the valve body is reduced; the base 20 is set to be the integrated structure, thereby facilitating the machining and assembly; and the valve tube 10 and the base 20 are made of stainless steel, thereby reducing the production costs. In the present disclosure, by the up-and-down movement of the valve core 40 in the cavity of the valve tube 10, the first interface 13 and the second interface 14 may be connected or disconnected, that is, the valve port is opened or closed; and by disposing the guide tube 21, a guide role is able to be played during assembly; and since the avoidance port 211 communicates with the second interface 14, it may be ensured that the fluid smoothly flows into the cavity of the valve tube 10.

In a radial direction of the valve tube 10, a size of the mounting base 22 is greater than an outer diameter of the valve tube 10; and a circulation area of the avoidance port 211 is not less than a circulation area of the second interface 14. By setting the size of the mounting base 22 to be greater than the outer diameter of the valve tube 10, it may be ensured that the mounting base 22 plugs the opening of the plugging end 12; and by setting the circulation area of the avoidance port 211 to be not less than the circulation area of the second interface 14, the smooth circulation of the fluid is facilitated.

In some embodiments, the guide tube 21 includes a tube body 212 and an annular convex ring 213 disposed on a first end of the tube body 212, a second end of the tube body 212 is connected with the mounting base 22, the avoidance port 211 is located on the tube body 212, an outer wall of the tube body 212 is connected with the inner wall of the valve tube 10, an outer diameter of the annular convex ring 213 is less than an outer diameter of the tube body 212, and an opening of the annular convex ring 213 forms the valve port 31.

Since the annular convex ring 213 is disposed, and the outer diameter of the annular convex ring 213 is less than the outer diameter of the tube body 212, when the valve port 31 is closed, the sealing effect of the valve port 31 is able to be better improved. The second end of the tube body 212 is connected with the mounting base 22, brazing may be used in the connection mode to ensure that the connection is more stable and reliable; and the outer wall of the tube body 212 is connected with the inner wall of the valve tube 10, and brazing may also be used in the connection mode to ensure that the connection is more stable and reliable.

Figure 9:
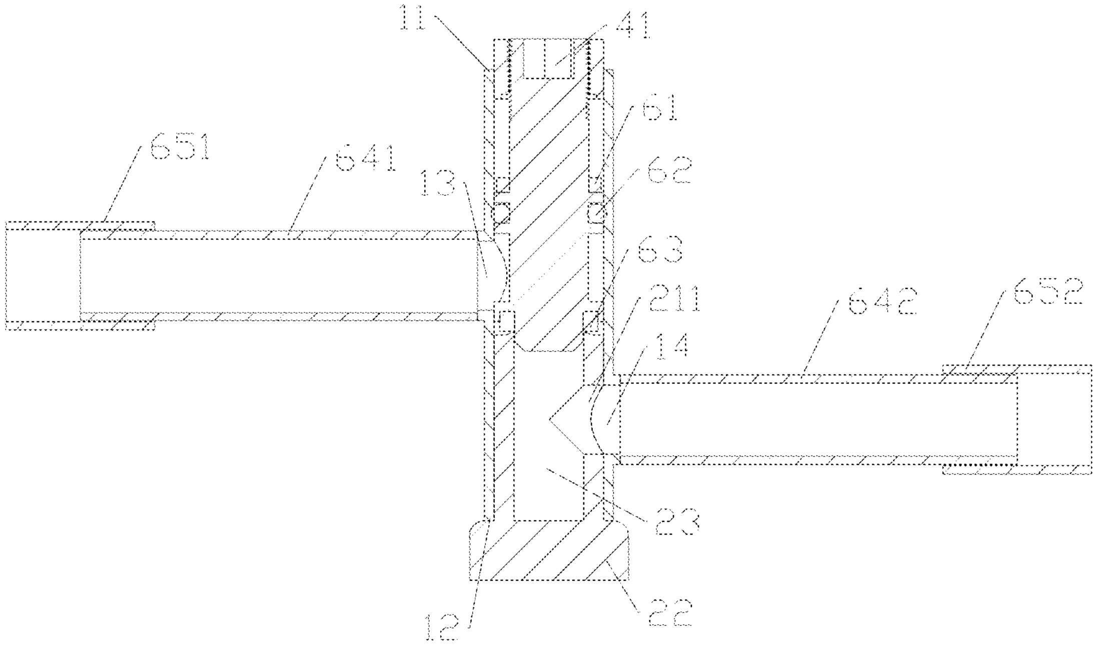
FIG. 9 illustrates a section view of the stop valve in FIG. 8.
Figure 10:
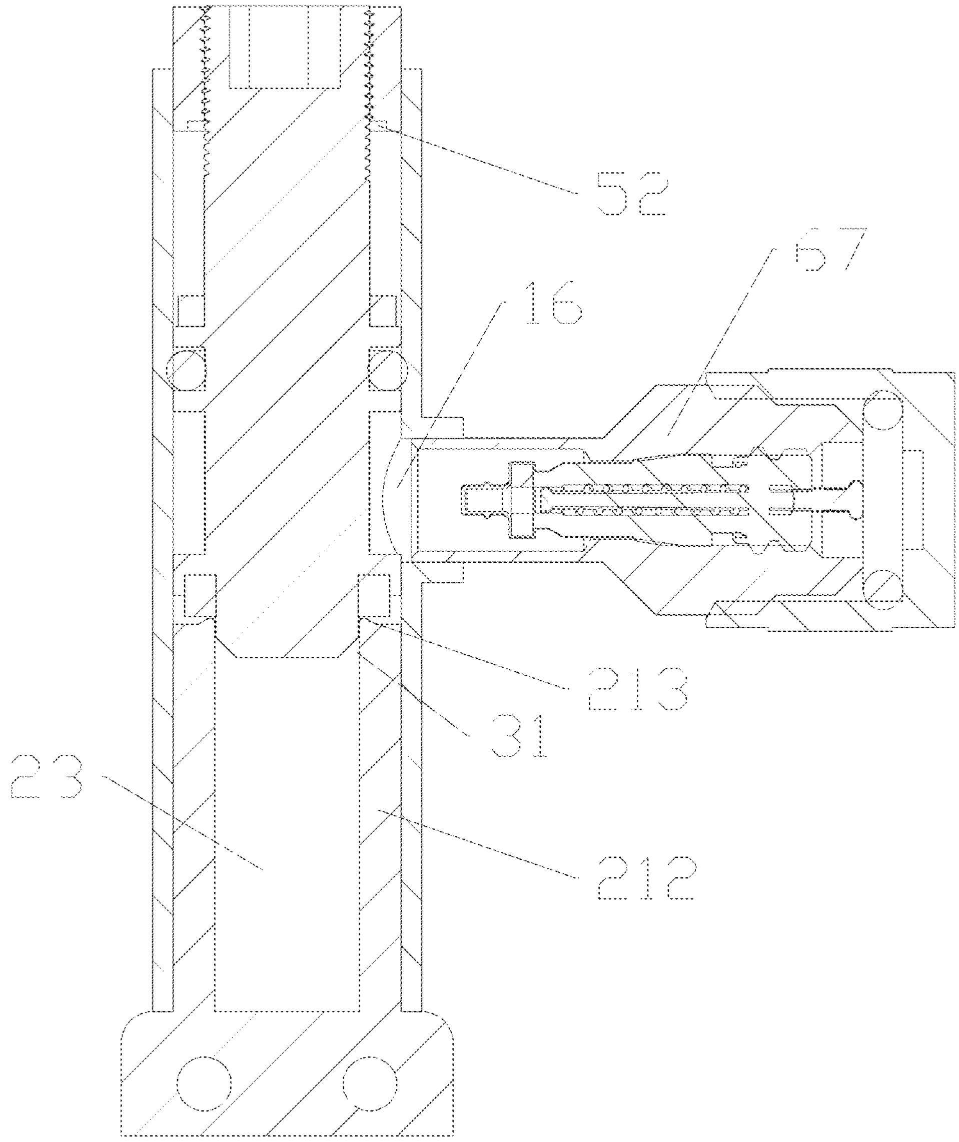
FIG. 10 illustrates a section view of the stop valve in FIG. 9 at another position.
Figure 11:
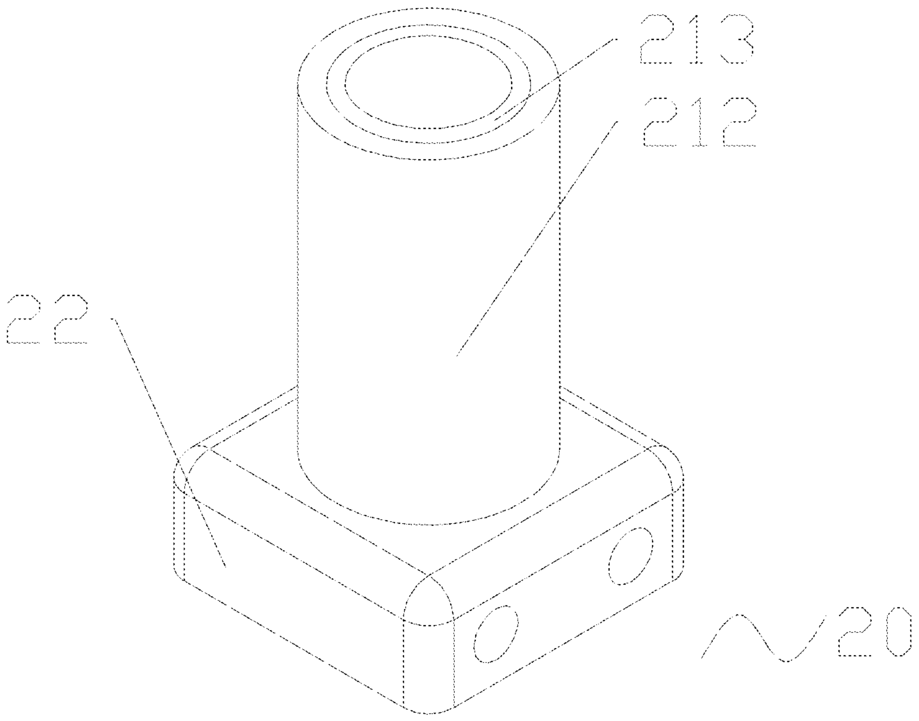
FIG. 11 is a structural diagram of a valve seat in FIG. 8.
Figure 12:
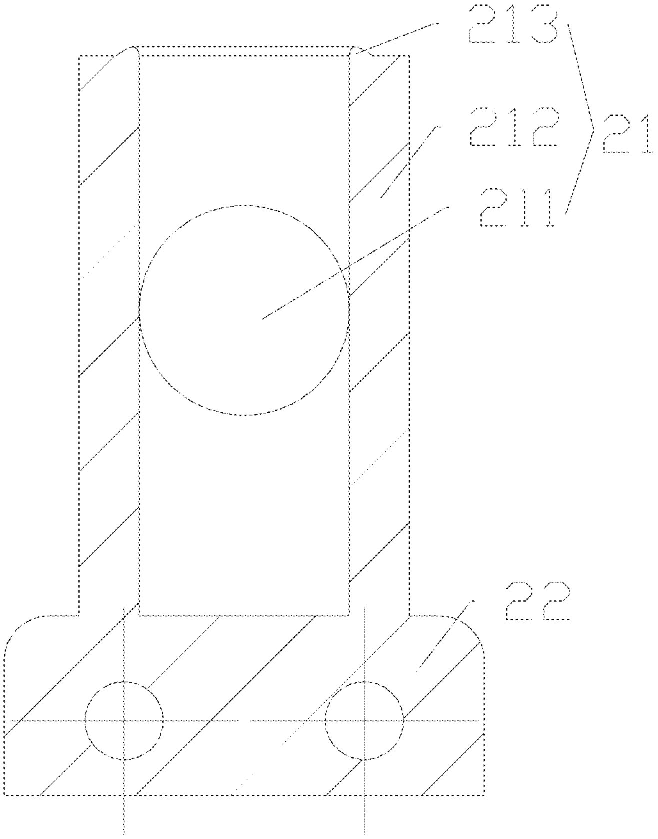
FIG. 12 illustrates a section view of a valve seat in FIG. 11.
Figure 13:
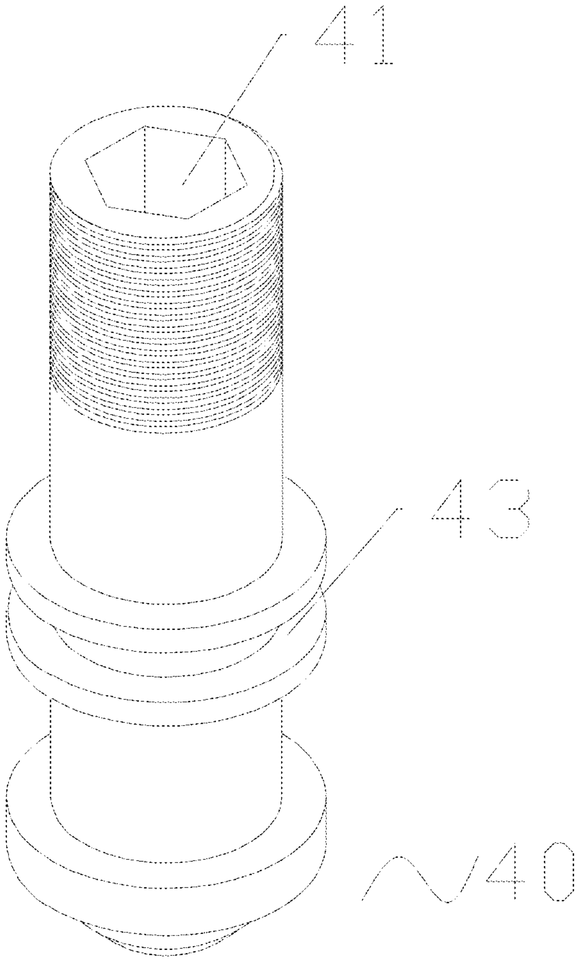
FIG. 13 is a structural diagram of a valve core in FIG. 8.
Figure 14:
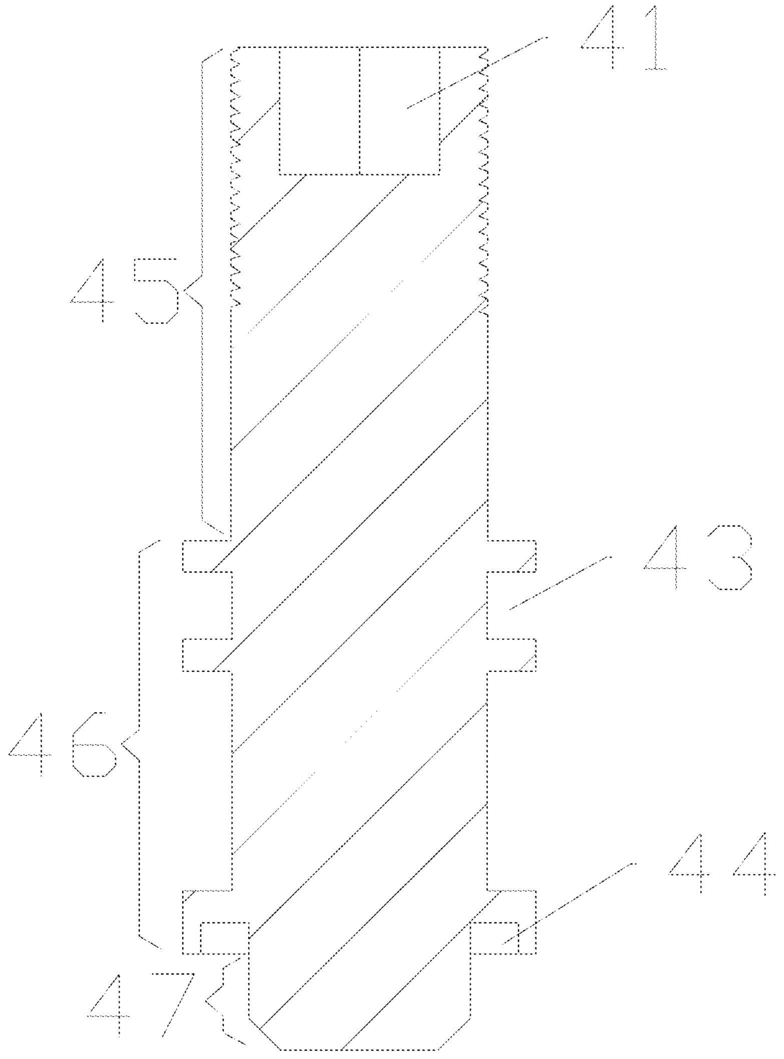
FIG. 14 illustrates a section view of a valve core in FIG. 13.
Figure 15:
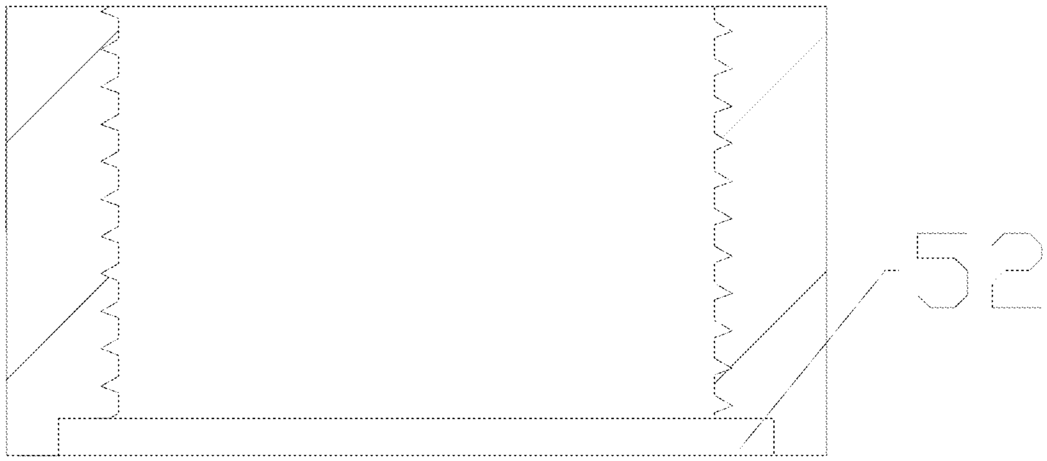
FIG. 15 illustrates a section view of a pressing block in FIG. 8.

As shown in FIG. 9, a space between the avoidance port 211 and the plugging end 12 in the guide tube 21 forms an accommodating chamber 23. By disposing the accommodating chamber 23 in the space between the second interface 14 and the plugging end 12, when the valve port 31 is opened, the fluid flows into the second interface 14 and enters the accommodating chamber 23, so that the kinetic energy of the fluid is able to be alleviated, thereby playing a role of buffering and enabling the fluid to flow more stably.

In some embodiments, the opening of the first annular groove 43 faces the inner wall of the valve tube 10, and the opening of the second annular groove 44 faces the guide tube 21.

In some embodiments, the mounting base 22 is provided with two through holes, and the two through holes are formed in the mounting base 22 in parallel. By disposing the two through holes, an installation with the external structure is facilitated.

Another embodiment of the present disclosure provides a machining method for machining the above-mentioned stop valve. The machining method includes: machining a plurality of flanging ports on a side wall of a stainless steel pipe by using a flanging machine, so as to machine the valve tube 10 of the stop valve; performing machining on a stainless steel bar, so as to machine the base 20 of the stop valve; performing cold upsetting and cutting machining on the stainless steel bar, so as to machine the valve core 40 of the stop valve; and performing cutting machining on the stainless steel bar or the stainless steel pipe, so as to machine the pressing block 50 of the stop valve, wherein the plurality of flanging ports includes the first interface 13, the second interface 14 and the air vent 16.

By using the above-mentioned machining method, part machining is able to be performed by using the existing stainless steel pipes, stainless steel bars and stainless steel plates, thereby reducing the machining difficulty and the material costs. Flanging machining is performed on the stainless steel pipe by using the flanging machine, so that the valve tube 10 of the stop valve is able to be machined; the valve core 40 may be obtained by performing cold upsetting and cutting machining on the stainless steel bar; and the base 20 and the pressing block 50 may be obtained by performing cutting machining on the stainless steel bar.

Moreover, the machining method further includes: performing cutting machining on the stainless steel pipe, so as to obtain the first connecting pipe 641 and the second connecting pipe 642; performing cutting machining on the red copper pipe, so as to obtain the third connecting pipe 651 and the fourth connecting pipe 652; and performing cutting machining on the stainless steel bar, so as to obtain the air valve structure 67.

Another embodiment of the present disclosure provides an assembly method for assembling the above-mentioned stop valve. The assembly method includes: S1, pressing the guide tube 21 of the base 20 of the stop valve into the valve tube 10 of the stop valve, correspondingly pressing the first connecting pipe 641, the second connecting pipe 642 and an inflating valve of the stop valve into the first interface 13, the second interface 14 and the air vent 16 of the valve tube 10; S2, performing furnace brazing on the overall structure assembled in S1; S3, sleeving the first sealing gasket 61, the second sealing gasket 63 and the sealing member 62 of the stop valve on the valve core 40 of the stop valve; S4, integrally loading the structure assembled in S3 into the valve tube 10; and S5, pressing the pressing block 50 of the stop valve into the valve tube 10, and then connecting the pressing block 50 and the valve tube 10 by laser welding or argon arc welding.

By using the above assembly method, the guide tube 21, the first connecting tube 641, the second connecting tube 642 and the air valve structure 67 are pressed into corresponding positions respectively, and furnace brazing may be performed on the overall structure assembled, such that the assembly is more convenient, and the connection is firm; then, the first sealing gasket 61, the second sealing gasket 63 and the sealing member 62 are sleeved on the valve core 40 of the stop valve and are installed in the valve tube 10; and the pressing block 50 is pressed into the valve tube 10, and the pressing block 50 is connected with the valve tube 10 by laser welding or argon arc welding, so that the connection is more stable and firm. The welding environment temperature is 1020° C. to 1040° C. The assembly method further includes: performing the water inspection sealing test on the assembled stop valve, so as to ensure the sealing performance of the stop valve; and drying the stop valve.

The foregoing descriptions are merely some embodiments of the present disclosure, and are not intended to limit the present disclosure, and for those skilled in the art, the present disclosure may have various modifications and changes. Any modifications, equivalent replacements and improvements, made within the spirit and principles of the present disclosure, shall fall within the protection scope of the present disclosure.

What is claimed is:

1. A stop valve, comprising:

a valve tube, wherein two ends of the valve tube are respectively an operating end and a plugging end, a side wall of the valve tube is provided with a first interface and a second interface, the first interface and the second interface both communicate with a cavity of the valve tube, the second interface is close to the plugging end relative to the first interface, and in the valve tube, a space between a side wall of the second interface on a side facing the plugging end and the plugging end forms a buffer chamber;

a base, which is used for plugging an opening of the plugging end;

a sleeve ring, which is fixed in the cavity of the valve tube, wherein an outer wall of the sleeve ring is in sealing fit with an inner wall of the valve tube, the sleeve ring is located between the first interface and the second interface, and the sleeve ring is provided with a valve port; and a valve core, which is movably disposed in the cavity of the valve tube, so as to close or open the valve port, wherein the valve core is located on a side of the sleeve ring facing the operating end; and the valve tube and the base both are made of stainless steel;

wherein the stop valve further comprises:

a first connecting pipe, wherein a first end of the first connecting pipe is connected with the first interface, and the first connecting pipe is made of stainless steel;

a second connecting pipe, wherein a first end of the second connecting pipe is connected with the second interface, the second connecting pipe and the first connecting pipe are disposed in parallel, and the second connecting pipe is made of stainless steel;

a third connecting pipe, which is sleeved on a second end of the first connecting pipe that is away from the first interface;

a fourth connecting pipe, which is sleeved on a second end of the second connecting pipe that is away from the second interface; and a first valve cover, a second valve cover and a third valve cover, wherein the first valve cover covers the operating end of the valve tube, the second valve cover covers an end of the third connecting pipe, and the third valve cover covers an end of the fourth connecting pipe.

2. The stop valve as claimed in claim 1, wherein the side wall of the valve tube is further provided with an air vent, the air vent communicates with the cavity of the valve tube, the stop valve further comprises an air valve structure, and the air valve structure is connected with the air vent.

3. A machining method for machining the stop valve as claimed in claim 1, wherein the machining method comprises:

machining a plurality of flanging ports on a side wall of a stainless steel pipe by using a flanging machine, so as to machine the valve tube of the stop valve;

performing cold heading and cutting machining on a stainless steel bar or the stainless steel pipe, so as to machine the sleeve ring of the stop valve;

performing cold heading and cutting machining on the stainless steel bar, so as to machine the valve core of the stop valve;

performing cutting machining on the stainless steel bar or the stainless steel pipe, so as to machine a pressing block of the stop valve; and performing stamping on a stainless steel plate or performing machining on the stainless steel bar, so as to machine the base of the stop valve.

4. An assembly method for assembling the stop valve as claimed in claim 1, wherein the assembly method comprises:

S1, pressing the sleeve ring of the stop valve into the valve tube of the stop valve, correspondingly pressing a first connecting pipe, a second connecting pipe and an inflating valve of the stop valve into the first interface, the second interface and the air vent of the valve tube, and connecting the base of the stop valve with the valve tube by spot welding;

S2, performing furnace brazing on an overall structure assembled in S1;

S3, sleeving a first sealing gasket, a second sealing gasket and a sealing member of the stop valve on the valve core of the stop valve;

S4, integrally loading a structure assembled in S3 into the valve tube; and S5, pressing a pressing block of the stop valve into the valve tube, and then connecting the pressing block and the valve tube by laser welding or argon arc welding.

5. The stop valve as claimed in claim 1, wherein an outer wall of the valve core is provided with external threads, the valve core is internally provided with an operation portion, the operation portion is disposed on an end away from the valve port, the stop valve further comprises:

a pressing block, disposed in the cavity of the valve tube, an outer wall of the pressing block is fixedly connected with the inner wall of the valve tube, the pressing block is provided with internal threads, and the internal threads match the external threads; and the sleeve ring is made of stainless steel, and/or the valve core is made of stainless steel, and/or the pressing block is made of stainless steel.

6. The stop valve as claimed in claim 5, wherein a side of the pressing block that faces the valve port is provided with an annular groove, the stop valve further comprises a first sealing gasket, the first sealing gasket is sleeved on the valve core, and the first sealing gasket is in stop fit with a periphery of the annular groove.

7. The stop valve as claimed in claim 1, wherein a side wall of the valve core is provided with a first annular groove and a second annular groove, the stop valve further comprises a sealing member and a second sealing gasket, the sealing member is located in the first annular groove, the sealing member is in sealing fit with the inner wall of the valve tube, and the second sealing gasket is located in the second annular groove; and when the valve port is closed, the second sealing gasket abuts against a periphery of the valve port.

8. The stop valve as claimed in claim 7, wherein the valve core comprises a first rod segment, a second rod segment and a third rod segment, which are connected in sequence, a diameter of the second rod segment is greater than a diameter of the first rod segment and a diameter of the third rod segment, the diameter of the third rod segment is less than a diameter of the valve port, and two ends of the second rod segment are respectively provided with the first annular groove and the second annular groove, an opening of the first annular groove faces the inner wall of the valve tube, and an opening of the second annular groove faces the sleeve ring.

9. The stop valve as claimed in claim 7, wherein the sleeve ring comprises a sleeve body and an annular convex rib disposed on an end of the sleeve body, an outer wall of the sleeve body is connected with the inner wall of the valve tube, an outer diameter of the annular convex rib is less than an outer diameter of the sleeve body, and an opening of the annular convex rib forms the valve port; and when the valve port is closed, the second sealing gasket abuts against the annular convex rib.

* * * * *